Nov. 4, 1969  H. HERTEL  3,476,336
BODY FOR FLIGHT AT HIGH SUBSONIC SPEED
Filed March 21, 1966  4 Sheets-Sheet 1
Prior Art  Fig.1
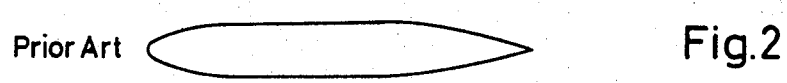
Prior Art  Fig.2
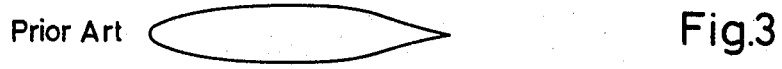
Prior Art  Fig.3
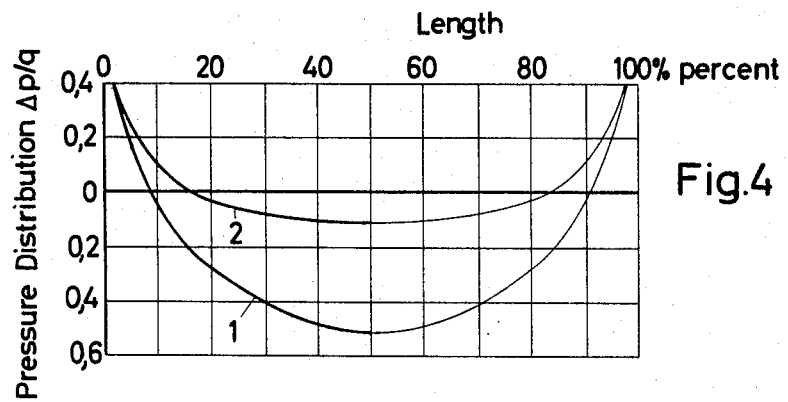
Fig.4
Fig.5
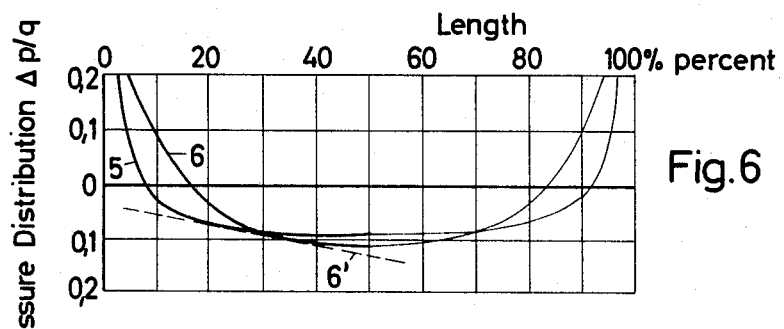
Fig.6
INVENTOR
Heinrich Hertel
BY
Michael S. Striker
ATTORNEYS Prior Art →

Prior Art →

Nov. 4, 1969   H. HERTEL   3,476,336
BODY FOR FLIGHT AT HIGH SUBSONIC SPEED
Filed March 21, 1966   4 Sheets-Sheet 3

INVENTOR
Heinrich Hertel

BY
Michael S. Striker
ATTORNEYS

INVENTOR 3,476,336
BODY FOR FLIGHT AT HIGH SUBSONIC SPEED
Heinrich Hertel, 36 Tannenbergaller,
1 Berlin 19, Germany
Filed Mar. 21, 1966, Ser. No. 535,991
Claims priority, application Germany, Mar. 20, 1965,
H 55,522
Int. Cl. B64c 1/38
U.S. Cl. 244—130                 16 Claims

ABSTRACT OF THE DISCLOSURE

A body flying at a high subsonic speed has a transverse thickness gradually increasing from the nose to an intermediate portion and gradually decreasing therefrom to the tail. In order to reduce drag and to produce a laminar flow, the nose portion is tapered at a smaller angle than the tail portion.

---

The present invention relates to a body for flight at high subsonic speed, and more particularly to a fuselage whose specific resistance to the passage through air is reduced by maintaining a laminar flow of the boundary layer in the region of the forward part of the fuselage.

It is one object of the invention to obtain the pressure distribution required for a laminar flow by a new shape and contour of the body or fuselage.

According to the present state of the art, the fuselages of airliners and transport planes are constructed as cylinders with rounded noses and tapered tails. Aircraft designed for long distance flights have fuselages whose transverse thickness is about 10 percent of the length, and short haul planes have fuselages whose transverse thickness is about 14 percent of the length. Cylindrical bodies have been generally accepted as fuselages by the aircraft industry because they are economically manufactured due to the fact that the skin has the same radius of curvature throughout. Furthermore, windows and interior equipment can be uniformly constructed for use anywhere along the length of the fuselage whereas, for example, a streamlined shape of the fuselage would require differently curved windows, and would provide less space for the rows of chairs in the rear than in the front.

However, a disadvantage of the standard cylindrical construction of a fuselage according to the prior art is that it encounters turbulent friction resistance during flight. At high Reynolds numbers, for example $2 \times 10^8$, the turbulent resistance component is substantially higher than the laminar resistance component for fuselages of this type.

The laminar boundary layer is stabilized by a pressure drop, whereas a pressure increase reduces the stability of the laminar boundary layer. A substantially cylindrical body has a pressure minimum at a circular portion spaced from the nose 15 percent of the length of the body, so that in this forward region, or even more forward, the laminar flow of the boundary layer is upset.

Another disadvantage of a cylindrical fuselage is its comparatively small cross section in the center part of the fuselage, which does not provide sufficient space for a large propulsion plant, as required for vertical take-off and landing.

For the two-dimensional laminar profiles of wings, it has been possible to maintain a laminar flow up to sufficiently high Reynolds numbers, for example $5 \times 10^7$.

Bodies of revolution of a corresponding profile, so-called laminar spindles, have a much lower pressure drop and consequently obtain a sufficiently long laminar flow only at comparatively small Reynolds numbers, for example $7 \times 10^6$, so that they are suited only for the fuselages of small gliders operating at low speeds.

It has been proposed to maintain a laminar flow of the boundary layer for the purpose of reducing the resistance at high Reynolds numbers, by sucking off the boundary layer along the entire surface of the fuselage. However, this solution has been found impractical.

It is an object of the present invention to overcome the disadvantages of mainly cylindrical fuselages, and to provide a fuselage which due to its contour obtains laminar flow of the boundary layer for a great part of the fuselage so that the resistance of the fuselage to movement through air is substantially reduced.

Another object of the invention is to provide a fuselage which has a lesser resistance to passage through air than conventional fuselages so that a fuselage can be used for supporting a higher load.

Since the pay load of the aircraft is increased, the additional expenses are justified.

The stability of the laminar boundary layer in the forward region of the fuselage depends on the pressure drop from the nose to the portion of the fuselage of maximum transverse thickness. The pressure gradient must be sufficiently great so that even at a Reynolds number of $2 \times 10^8$, the laminar boundary layer is stabilized for a long distance. It has been found that the shape of the rear part of the fuselage has only little influence on the gradient of the pressure prevailing at a forward portion of the fuselage.

With the above objects in view, the present invention relates to a body or fuselage particularly suited for flight at high subsonic speed. A body according to one embodiment of the invention has a transverse thickness gradually increasing from the nose of the body to an intermediate portion, and gradually decreasing from the intermediate portion to the tail of the body.

Preferably, the surface of the body between the nose and the intermediate portion is paraboloid, and is advantageously formed by rotation of a square parabola about the longitudinal axis of the body in a position in which the main axis of the parabola extends at an angle to the longitudinal axis of the body.

In the preferred embodiment of the invention, the portion of maximum transverse thickness is spaced from the nose a distance of at least 40 percent of the total length of the body. It is preferred that the transverse thickness of the body in the region of the intermediate portion is at least 15 percent of the length of the body.

The parabolic contour is selected so that the nose of the body is tapered and pointed, while the tail is tapered at a greater angle than the nose, contrary to the conventional shape of aircraft fuselages and nacelles.

The fuselage constructed in accordance with the invention, has a greater flow displacement and consequent greater pressure drop than a convetional fuselage, which favors a stable laminar flow. Furthermore, a fuselage according to the invention has a greater transverse maximum thickness and a greater volume than a conventional fuselage of the same length which is an important advantage for airliners and transport planes. An additional advantage of the new contour of the fuselage, is that the windshield of the pilot cockpit can be placed within the contour of the fuselage.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIGS. 1 and 2 are schematic views illustrating cylindrical fueslages according to the prior art;

FIG. 3 is a schematic view illustrating a wing profile according to the prior art;

FIG. 4 is a diagram illustrating the pressure distribution along the length of a fuselage and a wing having a paraboloid contour;

FIG. 5 is a schematic side view or plan view illustrating the contours of elliptic and paraboloid bodies bounded by surfaces of revolutions;

FIG. 6 is a diagram illustrating the pressure distributions over the length of the bodies shown in FIG. 5;

Figure 7:
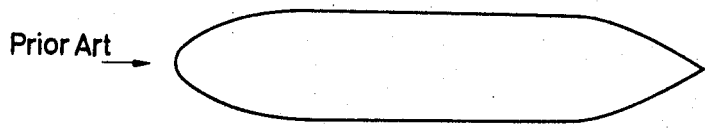
FIGS. 7 and 8 are schematic views illustrating fuselages according to the prior art with blunt noses and pointed tails.

Referring now to the drawings, FIG. 1 illustrates the mainly cylindrical shape of a fuselage of the well-known B707 plane, and FIG. 2 illustrates a similar but shorter cylindrical fuselage of the well known aircraft B737 which is used for shoter flight distances than the fuselage of FIG. 1. The cylindrical shape permits the use of the same windows along the length of the aircraft, and provides rows of seats of the same length. However, the turbulence of the boundary layer and the resistance of the air are great. FIG. 3 illustrates the wing profile NACA66–018. A body of revolution having the same contour is used for the fuselage of gliders at small Reynolds numbers.

FIG. 4 illustrtes the pressure distribution $\Delta p/q$ for potential flow along the length of a paraboloid contour for which the ratio between the maximum transverse thickness and the length is 18 percent. Graph 1 shows the pressure distribution for a two-dimensional paraboloid profile, for example of a wing, and graph 2 shows the pressure distribution for a surface of revolution generated by the same parabola. It will be seen that graph 1 has a greater pressure drop and increase, and that a pressure drop can be maintained for both paraboloid surfaces almost for half the length of the contour.

In the expression $\Delta p/q$, $p$ is the pressure variation, $q$ is the dynamic pressure which is represented by the following equation:

$$q = \frac{\delta}{2} V_0^2 \frac{kp}{m^2}$$

wherein $V_0$ is the flow velocity, and $\delta$ is the air density.

FIG. 5 shows an ellipsoid surface of revolution 3, and a paraboloid surface of revolution 4 according to the present invention. The nose of a conventional fuselage is blunt corresponding to the ellipsoid surface 3. The nose of a fuselage according to the invention is pointed for example in accordance with the paraboloid surface 4.

The ellipsoid surface of revolution 3 is generated by rotation of an ellipse about its greater main axis, while the paraboloid surface of revolution 4 is formed by rotation of a square parabola about an axis of rotation parallel to the tangent in the apex of the parabola.

A square parabola according to the following equation will generate a paraboloid surface of revolution according to the invention having its greatest diameter at half the length of the surface of revolution.

$$\frac{y}{L} = \frac{2d}{L} \cdot \frac{x}{L} \left(1 - \frac{x}{L}\right)$$

wherein $L$ is the length, and $d$ the maximum diameter of the body.

FIG. 6 illustrates the pressure distribution $\Delta p/q$ for the ellipsoid surface of revolution as a graph 5, while the pressure distribution of the paraboloid body is illustrated by graph 6.

A tangent 6′ common to both graphs indicates corresponding pressure gradients obtained at different points along the length of the profiles. The same pressure gradient is obtained for the ellipsoid contour a distance from the nose which is 20 percent of the total length, and for the paraboloid contour a distance from the nose which is about 40 percent. Assuming that this small pressure drop is just sufficient to maintain a laminar flow, such laminar flow will be maintained by the paraboloid fuselage along a forward part whose length is twice the length of the forward part of the ellipsoid fuselage along which a laminar flow prevails.

The paraboloid contour illustrtaed in FIG. 5 can be further improved to assure a laminar flow for a desirably long part of the fuselage at very high Reynolds numbers.

If the 20 percent ratio between transverse thickness and total length according to the invention is applied to cylindrical fuselages according to the prior art, a contour shown in FIG. 7 results. The same ratio applied to a stream-lined body results in the contour of FIG. 8 which is suitable for low Reynolds numbers.

In accordance with the present invention the 20 percent ratio between thickness and length is applied to bodies of revolution whose noses and adjacent front portions 41 are tapered at a smaller angle than the tail ends and the adjacent rear portions 42, resulting in a body whose transverse thickness gradually increases from a pointed nose to an intermediate portion and then gradually decreases from the intermediate portion of the tapered tail.

Figure 8:
Figure 9:
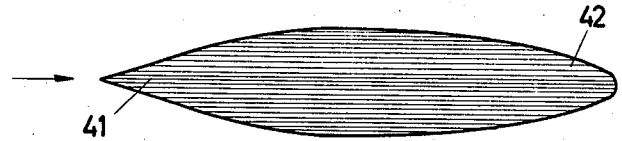
FIGS. 9 and 10 are schematic side views or plan views illustrating bodies having surfaces of revolution according to the present invention.
Figure 10:

It will be seen that the constructions according to the present invention as shown in FIGS. 9 and 10 have a thin forward end, contrary to the stream-lined shape exemplified by the construction of FIG. 8. In accordance with the invention, the intermediate portion of a maximum thickness is very narrow in longitudinal direction of the body, as opposed to the construction of the prior art in which a long main portion of the body has the same maximum thickness. The embodiment of the invention shown in FIG. 10, is particularly effective to maintain a laminar flow along the forward part of the fueslage, and has the cross section of maximum thickness in the rear part of the fuselage.

Figure 11:
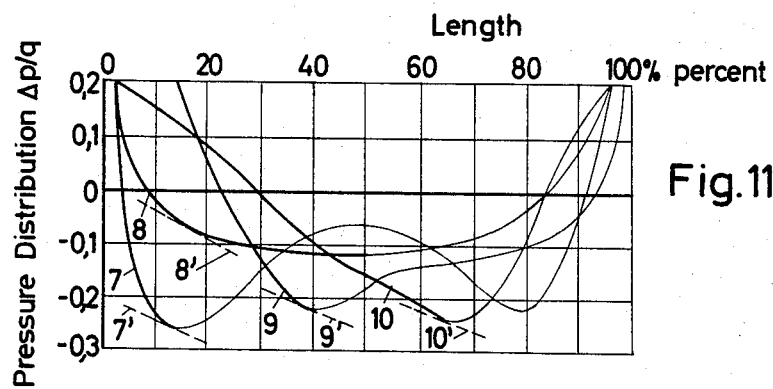
FIG. 11 is a diagram illustrating the pressure distribution over the lengths of the bodies illustrated in FIGS. 7 to 9.

FIG. 11 shows in diagrammatic form the pressure distribution $\Delta p/q$ over the length of the body expressed in percents. Graphs 7, 8, 9, and 10 are respectively associated with the contours shown in FIGS. 7, 8, 9 and 10.

The peak of negative pressure is reached for the graph 8 at a cross section which is spaced from the nose a distance about 15 percent of the length of the fuselage. Only along the foremost part of the fuselage, a laminar flow can be maintained.

Graph 8 shows that the pressure drop takes place along the contour of FIG. 8 substantially to a length of 50 percent, but the pressure gradient becomes very small at a point spaced from the nose a distance which is 15 percent of the length so that at high Reynolds numbers, laminar flow can only be maintained along the foremost 15 percent of the body. Consequently, the contour of FIG. 8 will maintain a laminar flow for a sufficient length only at low Reynolds numbers.

Graph 9 represents the pressure conditions for the contour according to the present invention shown in FIG. 9 in which the forward end of the body is tapered at a smaller angle than the rearward end, and where the point of maximum thickness is reached a distance of about 40 percent from the tip of the nose 41. Graph 9 indicates that the pressure drop with a high gradient takes place along the forward part of the body to a point located a distance of 40 percent of the total length.

Graph 10 illustrates the steep pressure drop to a distance of almost 70 percent of total length for the contour shown in FIG. 4, corresponding to the rearwardly located cross section of maximum thickness of the fuselage shown in FIG. 10.

Tangents 7', 8', 9' and 10' representing a pressure gradient sufficient for maintaining a stable laminar flow at high Reynolds numbers, are drawn at the corresponding points of graphs 7 to 10. If the pressure gradient is less, a laminar flow cannot be obtained at high Reynolds numbers of about $2 \times 10^8$.

Since the high pressure gradient is obtained by a small angle of the tapered nose and forward portion of the fuselage, the contour according to the present invention is the opposite of the prior art contours as will be apparent from a comparison of FIGS. 7 and 8 with FIGS. 9 and 10. Furthermore, the cross section of maximum thickness is in accordance with the invention placed more to the rear than in the prior art. The forward taper is preferably obtained by a paraboloid surface, as explained above, but the forward part of the fuselage may also be made conical or rounded-off or with a round projection from the contour. The rear portion of the body of fuselage may have an ellipsoid surface.

Figure 12:
FIG. 12 is a side view of a fueslage according to the invention provided with a projection forming a frontal surface adapted for a windshield.
Figure 13:
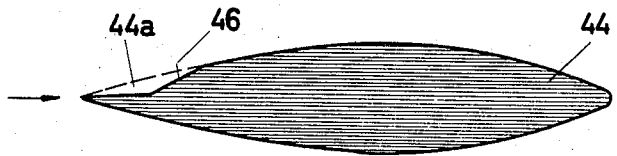
FIG. 13 is a side view of a fuselage according to the invention provided with a recess for forming a frontal surface for a windshield.
Figure 14:
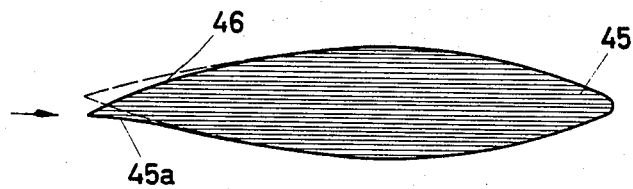
FIG. 14 is a side view of a fuselage according to the invention with a downwardly pointed nose whose top surface provides a frontal surface for a windshield.

Fuselages 43, 44 and 45, as shown in FIGS. 12 to 14, are provided with frontal surfaces 46 slanted to the longitudinal axis of the fuselage at an angle permitting the crew a forward view through a windshield installed in the frontal surface 46. In the embodiment of FIG. 12 the frontal surface is provided in a projection 43a of the fuselage since the angle of the nose portion is too small. In the embodiment of FIG. 13, the frontal surface 46 is provided in a recess 44a in the front portion of the fuselage. In the embodiment of FIG. 14, the tapered nose portion of the fuselage is pointed downward so that the tip of the nose is located below the longitudinal main axis of the fuselage. The nose 45a is pointed downward sufficiently so that the top surface 46 behind the nose has the proper slant for installation of a windshield, which could not be provided in the normally positioned nose shown in broken lines.

Figure 15:
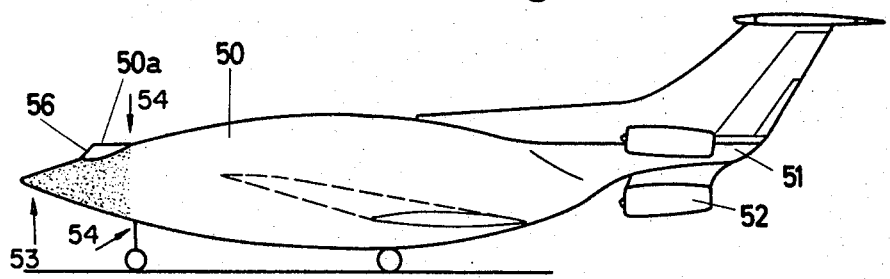
FIG. 15 is a schematic side view illustrating an aircraft provided with the fuselage according to the invention.
Figure 16:
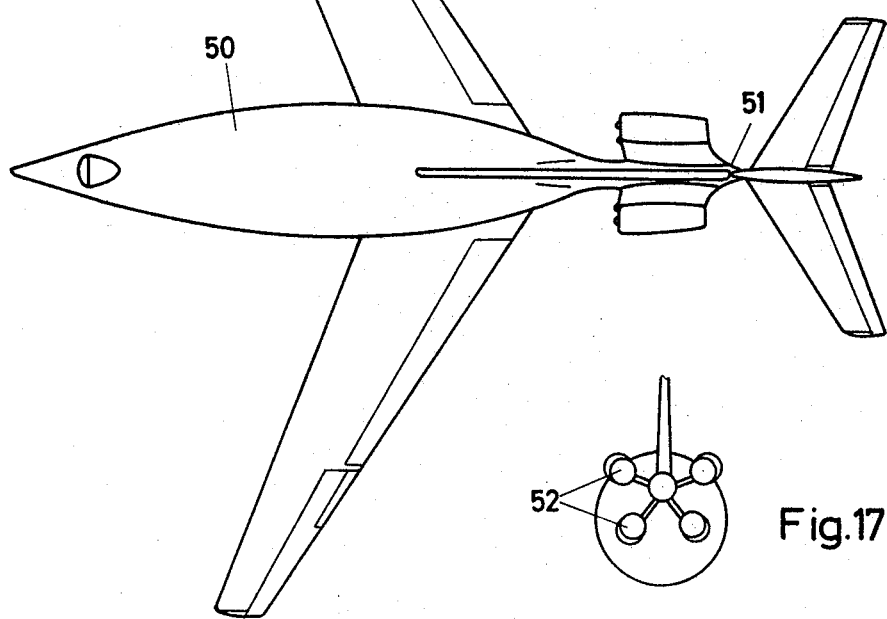
FIG. 16 is a plan view of FIG. 15.
Figure 17:
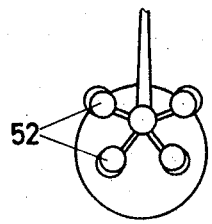
FIG. 17 is a fragmentary rear view of the embodiments of FIGS. 15 and 16.

An airplane according to the invention is shown in FIGS. 15, 16 and 17 to include a fuselage 50, and a thin support 51 at the rear end of the fuselage on which four jet engines 52 are mounted. This arrangement is not an object of the present invention. The fueslage has a projecting portion 50a for a windshield 56. In order to avoid turbulence, the wall portion of the fuselage partly located rearward of the frontal surface of windshield 56 is perforated in the region between the cross sections 53 and 54, and a boundary layer of air is sucked in.

It will be understood that each of the elements described above, or two or more together, may also find a useful application in other types of bodies for flight at subsonic speeds, differing from the types described above.

While the invention has been illustrated and described as embodied in a fuselage having a forward portion tapered at a smaller angle than its rearward portion, a high thickness to length ratio, and the cross section of maximum thickness located far from the nose, it is not intended to be limited to the details shown, since various modifications and structural changes may be made without departing in any way from the spirit of the present invention.

What is claimed as new and desired to be secured by Letters Patent is:

1. A fuselage body for flight at a high subsonic speed, having a surface of revolution and a nose and a tail and a transverse thickness gradually increasing from said nose to a portion of said body intermediate said nose and said tail, and gradually decreasing from said intermediate portion to said tail, said nose and the adjacent forward part being tapered at a smaller angle than said tail and the rearward part of said body adjacent said tail, and the maximum transverse thickness of the fuselage body being greater than 15 percent of the total length of the fuselage body between said nose and said tail so that air flows in a laminar flow along the forward part of said body.

2. A body according to claim 1 having between said nose and said intermediate portion a paraboloid surface.

3. A body according to claim 1 having between said nose and said intermediate portion a paraboloid surface formed by rotation of a square parabola about the longitudinal axis of said body.

4. A body according to claim 1, wherein said nose is pointed.

5. A body according to claim 1 having between said nose and said intermediate portion a paraboloid surface, formed by rotation of a square parabola about the longitudinal axis of said body in a position in which the main axis of the parabola extends at an angle to said longitudinal axis; wherein said intermediate portion of maximum thickness is narrow in longitudinal direction and located spaced from said nose a distance of at least 40 percent of the length of the body between said nose and said tail; wherein the transverse thickness of said body in the region of said intermediate portion is at least 15 percent of the length of said body between said nose and said tail; and wherein said nose is pointed.

6. A body according to claim 1 wherein said intermediate portion of maximum thickness is substantially smaller in longitudinal direction than the distances thereof from said nose and said tail, and is located spaced from said nose a distance of at least 40 percent of the length of the body between said nose and said tail.

7. A fuselage for flight at a high subsonic speed, having a surface of revolution and a tapered pointed nose and a tail, and a maximum transverse thickness greater than 15 percent of the length of said fuselage, in a portion thereof which is located spaced from said nose a distance of at least 40 percent of said length, said nose and the adjacent forward part of said fuselage being tapered at a smaller angle than said tail and the rearward part of said fuselage adjacent said tail, the transverse thickness of said forward part gradually increasing toward said portion of maximum thickness, and the transverse thickness of said rearward part gradually decreasing from said portion toward said tail so that a laminar flow of the boundary layer takes place along a substantial part of said fuselage, the surface of said fuselage between said nose and said portion being shaped so that a continuous pressure drop takes place along said surface.

8. A fuselage according to claim 7 wherein said maximum thickness is between 17 percent and 20 percent of said length.

9. A fuselage according to claim 7 having between said nose and said portion a paraboloid surface.

10. A fuselage according to claim 7 having between said nose and said portion a paraboloid surface; and wherein said nose has a pointed conical surface merging into said paraboloid surface.

11. A fuselage according to claim 7 having rearwardly of said nose a frontal surface slanted to the longitudinal main axis of said fuselage at such an angle as to be adapted for a windshield permitting a forward view.

12. A fuselage according to claim 11 wherein said fuselage has a recess, and wherein said slanted frontal surface is the rear surface of said recess.

13. A fuselage according to claim 11 wherein said fuselage has a projection, and wherein said slanted frontal surface forms the front surface of said projection.

14. A fuselage according to claim 11 wherein said nose is downward slanted and has a tip located below the main axis of said fuselage so that a top surface portion located rearwardly of said nose forms said frontal surface and is slanted at said angle to permit a forward view.

15. A fuselage according to claim 11 having a wall portion located rearward of said frontal surface and having perforations open on the outer surface of said fuselage for sucking in the boundary layer of air for reducing or eliminating turbulence.

16. A fuselage for flight at high subsonic speed including a nose and a tail, and having a surface of revolution, and a transverse thickness gradually decreasing from a portion of maximum thickness toward said tail and gradually increasing from said nose to said portion of maximum thickness, said portion having a thickness greater than 17% of the length of the fuselage between said nose and said tail, and being spaced from said nose a distance which is at least 40% of said length so that the pressure gradient decreases from said nose along said surface of revolution and remains near said portion of maximum thickness sufficiently steep to maintain a laminar flow.

References Cited

UNITED STATES PATENTS

| | | | |
|---|---|---|---|
| 3,346,220 | 10/1967 | Lemelson | 244—130 X |
| 2,956,760 | 10/1960 | Attinelli | 244—130 |
| 3,114,525 | 12/1963 | Morgan et al. | 244—130 X |

FOREIGN PATENTS 896,031   5/1962   Great Britain.

OTHER REFERENCES

"The Flow and Force Characteristics of Supersonic Airfoils at High Subsonic Speeds," NACA, Technical Note #1211, March 1947, pp. 10–13 and FIGS. 1 and 10.

Aviation Week, Aug. 16, 1948, pp. 21, 22 and 24.

Jane's All the World's Aircraft, 1963–1964, McGraw-Hill Book Co., Inc., p. 257.

MILTON BUCHLER, Primary Examiner

J. E. PITTENGER, Assistant Examiner

U.S. Cl. X.R.

244—42